June 9, 1925.  M. S. COMPTON ET AL  1,541,480

TRANSPARENT STENCIL

Filed Nov. 26, 1923

INVENTORS
MARSHALL S. COMPTON,
EDWARD O. SCHREIBEIS,
BY
William J. Jackson
ATTORNEY Patented June 9, 1925.

1,541,480

UNITED STATES PATENT OFFICE.

MARSHALL S. COMPTON AND EDWARD G. SCHREIBEIS, OF NEW YORK, N. Y.

TRANSPARENT STENCIL.

Application filed November 26, 1923. Serial No. 676,892.

*To all whom it may concern:*

Be it known that we, MARSHALL S. COMPTON and EDWARD G. SCHREIBEIS, both citizens of the United States, and residing at the city, county, and State of New York, respectively, have jointly invented a certain new and useful Transparent Stencil, of which the following is a specification.

Generally stated the invention relates to the art of illustrating, particularly illustrating what may be termed "life-action" pictures as cartoons and the like.

The leading object of the present invention may be said to provide a stencil whereby skilled artists may more rapidly and uniformly draw pictures depicting action. A further object is to provide a stencil whereby unskilled persons are enabled to make drawings depicting human beings or animals in various positions of activity which otherwise they would be unable to accomplish. A still further object is to provide a stencil which may be employed either for instruction or for amusement purposes. A still further object is to provide a stencil whereby a plurality of illustrations requiring identical or slightly modified features or positions may be expeditiously produced. A still further object is to provide a stencil which may be successfully employed in connection with producing films for animated or moving pictures. A still further object resides in providing a stencil possessed of commercial possibilities, as providing silhouettes upon lamp shades and similar articles.

With these and other objects in view the invention consists of the improvements hereinafter described and finally claimed.

A single embodiment of the present invention is shown in the accompanying drawings for illustrative purposes only and in which:—

Figure 1:
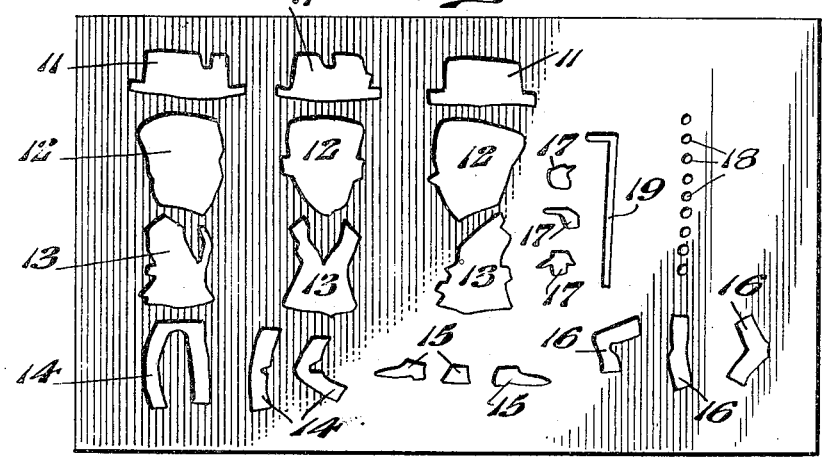
Fig. 1, is a face view of a stencil sheet depicting, for illustrative purposes only, various parts for outlining a human being of the male species.

In carrying out the invention a stencil sheet or a plurality of such sheets, which may be of transparent or opaque material, are employed. For illustrative purposes a stencil sheet 10 is shown in the drawings, the cut-away portions of which are symbolic of a man and incidental wearing apparel. It will be understood that the stencil may depict human, animal or other parts and that the parts are arranged to provide various and selective positions in preparing, for instance, a pen and ink sketch. In Fig. 1, the stencil sheet 10, is shown as being provided with cut-away portions 11 symbolic of a hat in three positions; cut-away portions 12 symbolic of a human head in three positions; cut-away portions 13 symbolic of a human body in three positions; cut-away portions 14 symbolic of legs in two positions; cut-away portions 15 symbolic of feet in varied arrangement; cut-away portions 16 symbolic of arms; cut-away portions 17 symbolic of hands; and other cut-away portions as 18 representing buttons and 19 as representing, for instance, a cane. It will of course be understood that the subjects, number and positions thereof are capable of almost unlimited arrangement and the present showing is but a single embodiment of the invention.

Figure 2:
Fig. 2, is a view showing a tracing of certain of the stencil parts to depict a partly finished male figure.

In preparing, for instance, a pen and ink sketch of a man as symbolized upon stencil sheet 10 the following system is employed: The stencil sheet is laid upon drawing paper and by means of a pencil, guided around the edges of one of the cut-away portions 11, a hat is traced upon the drawing paper. In the drawing the center-hat has been selected. There is next traced a head. The stencil sheet is so positioned that a cut-away portion 12 of the stencil sheet is disposed immediately below the hat as traced and so that the hat is correctly positioned. As thus traced the lines of the head and hat overlap. In a selective manner body, arms, legs, hands and feet are in turn traced by means of the stencil sheet with the result that a sketch results as shown in Fig. 2. This is what is termed the rough pencil sketch and can be very rapidly made even by a person unskilled in art. The stencil sheet is of course reversible so that varied positions may be obtained.

Figure 3:
Fig. 3, is a view illustrating the traced portion shown in Fig. 2, sketched in to complete the picture.

To complete the sketch such lines as are needed are inked in and in addition facial expression, collar, neck tie, pockets, hatband and other complemental details are added to provide the finished drawing shown in Fig. 3. Obviously this finishing process varies according to the class of work desired.

By the above described stencil, the various objects previously set forth are attained to provide subjects in life-like activity. It forms an admirable way to produce cartoons for newspaper, magazine and like publications. In fact, the stencil as above described is capable of varied use and it is to be understood that the form shown and described is for explanation purposes only and that various changes may be effected in the employment of the device without departing from the spirit or scope of the appended claim.

What we claim as new and desire to secure by Letters Patent is:—

An article of the character stated comprising a transparent stencil sheet having a plurality of individual cut-away portions therein denoting several postures of the major portion of a subject to be illustrated, said cut-away portions being arranged in disjointed and selected relation and showing various positions of activity whereby in use rough sketches of outlines only may be inscribed or traced from the same transparent stencil sheet of numerous postures of said subject, the disjointed outlines of which are to be subsequently completed by the artist.

In testimony whereof we have hereunto signed our names.

MARSHALL S. COMPTON.
EDWARD G. SCHREIBEIS.

Witnesses:
Jos. J. Lowe,
John Scheier.